INVENTORS
PETER PFLANZ
JOSEF MUSKAT
WARNER OHL

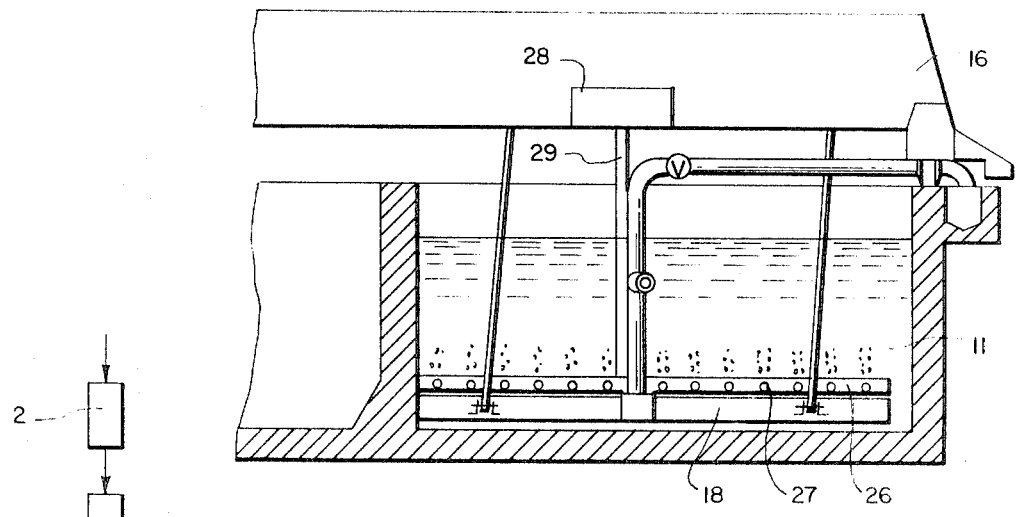
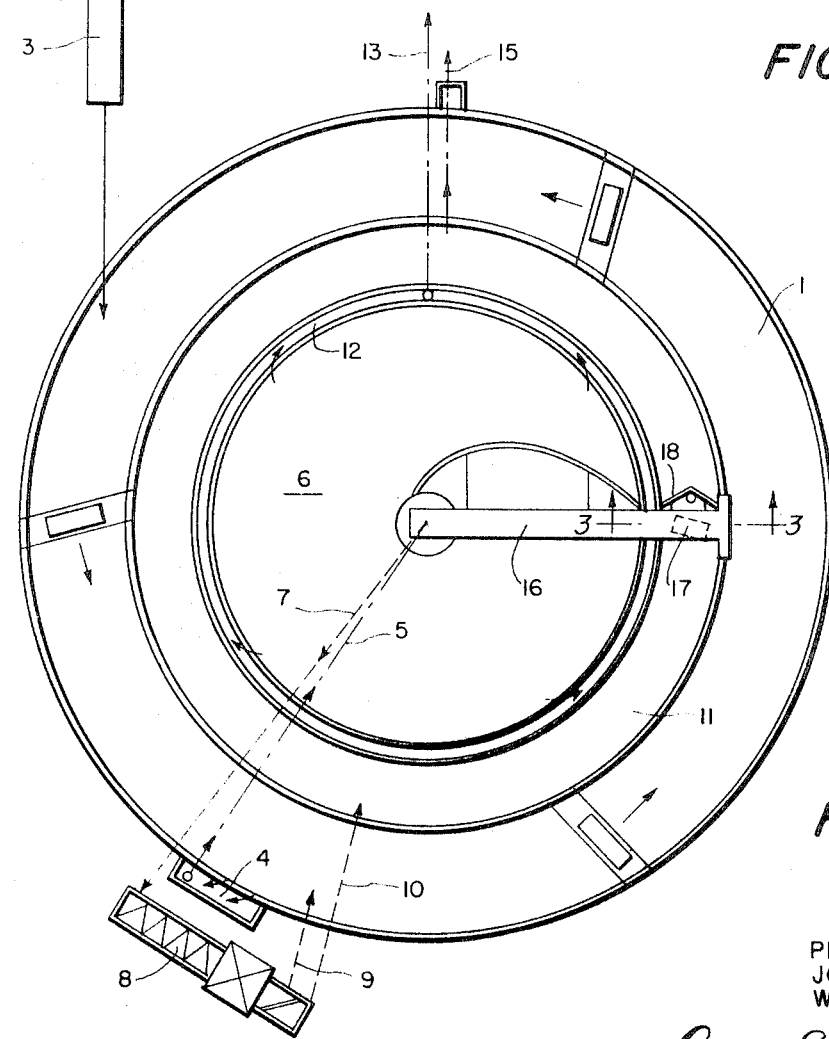
FIG. 4
FIG. 1
INVENTORS
PETER PFLANZ
JOSEF MUSKAT
WERNER OHL
BY Larson and Taylor
ATTORNEYS July 27, 1971    P. PFLANZ ET AL    3,595,783
METHOD AND APPARATUS FOR AEROBIC STABILIZATION OF SLUDGE
Filed Feb. 28, 1969    2 Sheets-Sheet 2

BY *Larson and Taylor*

ATTORNEYS

3,595,783
METHOD AND APPARATUS FOR AEROBIC STABILIZATION OF SLUDGE

Peter Pflanz, Josef Muskat, and Werner Ohl, Michelbach, Germany, assignors to Passavant-Werke, Michelbacherhutte, Germany
Filed Feb. 28, 1969, Ser. No. 803,182
Claims priority, application Austria, May 21, 1968, 4,872/68
Int. Cl. C02c 1/10
U.S. Cl. 210—14              16 Claims

ABSTRACT OF THE DISCLOSURE

A method and apparatus for aerboic stabilization of sewage sludge. Separate circulating and aerating devices are provided, the former for stirring up sludge from the tank bottom and the latter for injecting gas into the stirred up sludge. Both devices may be mounted on the same traveling bridge with the aerating means forward of the circulating means for movement together along the tank.

BACKGROUND

This invention relates to the treatment of sewage; and in particular it relates to the aerobic stabilization of sewage sludge.

In the biological treatment of waste water with primary sedimentation, aeration and secondary sedimentation, primary sludge is produced in the primary tank, and activated excess sludge is produced in the second tank, that is, sludge which is not reconveyed to the areation tank. The two types of sludge have a high organic matter content, and consequently, dehydration of this sludge is slow and difficult. Further, if the oxygen of this sludge is relatively deficient, then the sludge is subject to acid fermentation which results in a very bad odor. To avoid these difficulties, it has already been proposed to further treat the excess sludge by blowing additional gas such as air into the basins containing the sludge. However, it has been found that extraordinarily large volumes of air are required in order to simultaneously circulate the sludge and prvoide the necessary oxygen content. In view of this, the further treatment of sludge is a relatively complicated and uneconomical procedure. If the circulation is insufficient, the sludge settles on the bottom of the tank, as a result of which the sludge particles will be subject to fermentation since they will no longer be in contact with the introduced oxygen. On the other hand, if sufficient air is introduced into the sludge for sufficient circulation thereof, the process will be quite expensive, and thus, uneconomical.

Thus, there exists a need for improved methods and apparatus for the further treatment of sewage sludge.

SUMMARY OF THE INVENTION

Thus, it is an object of the present invention to provide a method and apparatus for the further treatment of sewage sludge, and in particular the aerobic stabilization of sewage sludge, which method and apparatus overcomes the disadvantages in the prior art.

In accordance with the present invention there is provided an arrangement including a tank for receiving sludge to be treated. A circulating means, which is at least partially located at the bottom of the tank, continuously and sufficienly circulates the sludge while a separate aerating means introduces the gas such as air into the stirred-up sludge. With this arrangement even the heavy sludge particles are stirred up from the bottom of the tank and sufficiently aerated. This results in uniform and economic aerobic stabilization of the total contents of the tank.

In accordance with a preferred feature of the present invention, the aeration means and the circulation means are mounted and operated independently of each other. Consequently, each of the two means can be designed independently of the other for best carrying out their individual functions. This feature of independence from each other is considerably more important in the treatment of sludge than in the treatment of waste water. In the former case much greater power demands are necessary for introducing the proper amounts of oxygen and also for providing adequate circulation of the sludge. For example, in sludge treatment apparatus designed according to the same principles as waste water treatment apparatus wherein the means for introducing the oxygen is also used to circulate the sludge, then the power demands of this oxygen introduction means would be enormous, especially in comparison with the power actually demanded for the sole function of introducing the necessary oxygen. Conversely, if the apparatus is designed with only sufficient power to introduce the necessary oxygen, then the circulation provided by this apparatus would be very inadequate. Thus, by separating the areation means from the sludge circulating means, and designing each apparatus separately to best carry out its function, it has been found that the power demand can be reduced by approximately 60% to 80% in comparison with the previous arrangement. With the present invention sufficient power is supplied to the circulating means for circulating the sludge while the power supplied to the aerating means is relatively small.

In accordance with a preferred arrangement of the present invention, the circulating means comprises a scraper blade arranged to move along the bottom of the tank, thereby assuring that all sludge, including those particles which have settled on the bottom of the tank, are stirred up and moved about. Preferably, the circulating means also includes a circulating pump which draws sludge from the bottom of the tank and conveys the same to an upper part of the tank, preferably in the vicinity which is being acted upon by the aeration means, whereby the aeration of the sludge particles is considerably increased. Further, the power demand of the pump is relatively low since the height to which the sludge is lifted is relatively small.

In accordance with another feature of the invention, the scraper blade is V-shaped, with its apex facing rearwardly, away from the direction of travel of the scraper blade, and the inlet of the circulation pump is located inside of the apex of the V-shaped scraper blade. With this arrangement, the bottom scraper blade and the circulation pump positively prevent the settling of sludge particles on the bottom of the tank and assure that all particles are conveyed to the upper portion of the tank. In addition, the circulating pump is designed as a conveying means whereby, instead of delivering the sludge to the upper portion of the tank, it can deliver the sludge all the way to the outside of the tank. This, of course, has the advantage of eliminating the need for a further conveying means.

In accordance with a further feature of the present invention, the areation means comprises a set of surface aerators, preferably a bladed wheel mounted for rotation about a horizontal axis. Aeration rotors of this type are particularly suitable for treating thick, solid materials such as sludge since they do not become blocked by large sludge particles. Further, with a very minor power demand, they introduce sufficient oxygen into the sludge. Further, when using shallow tanks with aeration rotors of this type, it is sufficient to provide, in lieu of the scraper blade a simple downwardly inclined baffle plate, which, in combination with the aeration rotor, will provide sufficient circulation of the sludge.

The aeration means can be arranged stationarily in the tank, or connected to the scrapper blade as a part thereof. However, if the sewerage treatment apparatus includes a traveling bridge located above the tank for movement therealong, then it is particularly advantageous to arrange both the circulation means and the aeration means on the bridge so that a single drive means, namely the means for driving the bridge, will also drive both the circulation means and the aeration means. Further, with this arrangement, it is possible to omit additional supporting and mounting structure for the circulation means and the aerating means other than the elements necessary for connecting these means to the bridge. Further, in order to provide economy in operation, it is preferable to arrange the aerating means above the circulating means and forward thereof in the direction of travel along the tank.

In a preferred arrangement of a sewage treatment plant, the tank for aerobic stabilization of sludge may be combined with standard activated sludge treatment plants. For example, the aerobic stabilization tank may be an annular shaped tank surrounding a circular secondary tank. With this arrangement, which, incidentally, requires a minimum of floor space, it is possible to use the same bridge for traveling over both of the two tanks. In addition, if the plant also requires a primary or aeration tank, this may be provided in the form of an annular shaped tank surrounding the sludge treatment tank. With this arrangement, when using a traveling bridge for traveling over either the primary aeration tank or the secondary tank, then the said circulating means and aerating means of the aerobic stabilization tank may be mounted on this same bridge.

The present invention also includes a method for stabilizing excess sludge and/or primary sludge by aerating the same wherein the sludge is circulated independently from the aeration thereof.

Thus, it is an object of this invention to provide a new and improved method and apparatus for treating sludge, especially for the aerobic stabilization thereof.

It is another object of this invention to provide a sludge treating apparatus employing a circulating means and an aeration means, the two means being mounted and being operated independently of each other.

It is another object of this invention to provide a sludge treatment apparatus wherein a circulating means comprising a scraper blade and a pump circulate the sludge while an aeration means mounted forward of the circulating means causes the necessary oxygen to be introduced into the stirred-up sludge.

Other objects and the attendant advantages of the present invention will become apparent from the detailed description to follow together with the accompanying drawings.

BRIEF DESCRIPTION OF THE DRAWINGS

There follows a detailed description of preferred embodiments of the present invention to be taken together with the accompanying drawings. However, it is to be understood that the detailed description and the drawings are provided for purposes of illustration and that the invention is capable of numerous modifications and variations apparent to those skilled in the art without departing from the spirit and scope of the invention.

FIG. 1 is a plan view of a waste water treatment plant including a sludge treatment tank constructed in accordance with the features of the present invention.

FIG. 4 is a vertical sectional view similar to FIG. 3 but showing a modification.

DETAILED DESCRIPTION OF THE PREFERRED EMBODIMENTS

Figure 3:
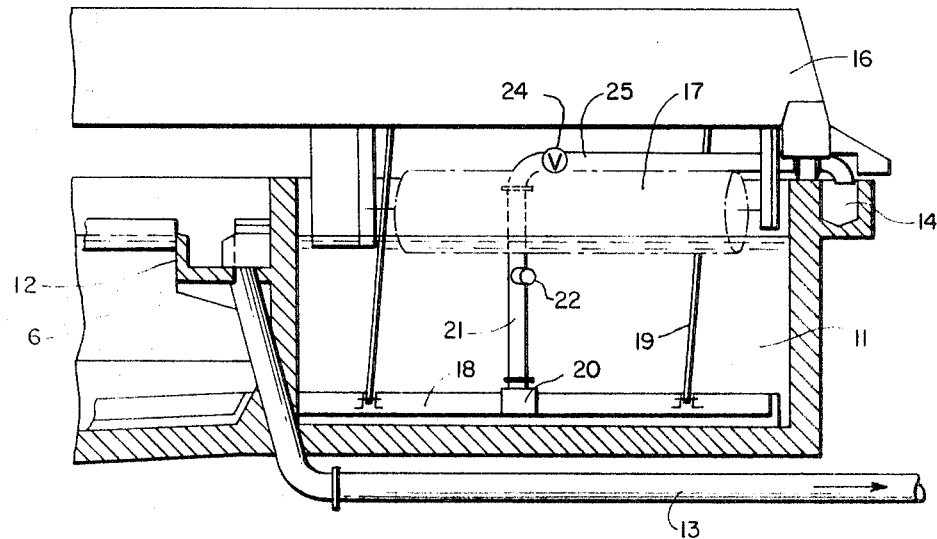
FIG. 3 is an enlarged vertical sectional view taken along lines 3—3 of FIGS. 1 and 2.

Referring now to the drawings, like numerals are used to represent like elements throughout the several views.

In FIG. 1 there is shown a waste water treatment plant including an aeration tank 1 into which the waste water is conducted after passing through a screen 2 and a grit chamber 3. The aerated waste water flows through an overflow channel 4 to an influent pipe 5 and into a secondary tank 6 where the activated sludge settles. The settled sludge is then drawn from the center of the secondary tank 6 and transferred through a pipe 7 to a suitable conveyor, for example, a spiral conveyor 8. A portion of this sludge, which is referred to as "return sludge" is reconveyed by the conveyor 8 to a pipe 9 to the aeration tank 1. The other portion of the sludge, which is referred to as the excess sludge, enters the pipe 10 through which it flows to the tank 11 where aerobic stabilization of the sludge follows. If the plant also included a primary tank, the sludge from this primary tank would also be transferred to the tank 11. This tank 11 includes the features of the present invention for carrying out aerobic stabilization of the sludge.

As shown in FIGS. 1 and 3, the purified waste water from the secondary tank 6 enters a collecting channel 12 from which it is discharged through a pipe 13. The stabilized sludge, after treatment in the tank 11, is pumped to a collecting channel 14 from which it is withdrawn through a suitable pipe 15 (see FIG. 1).

Figure 2:
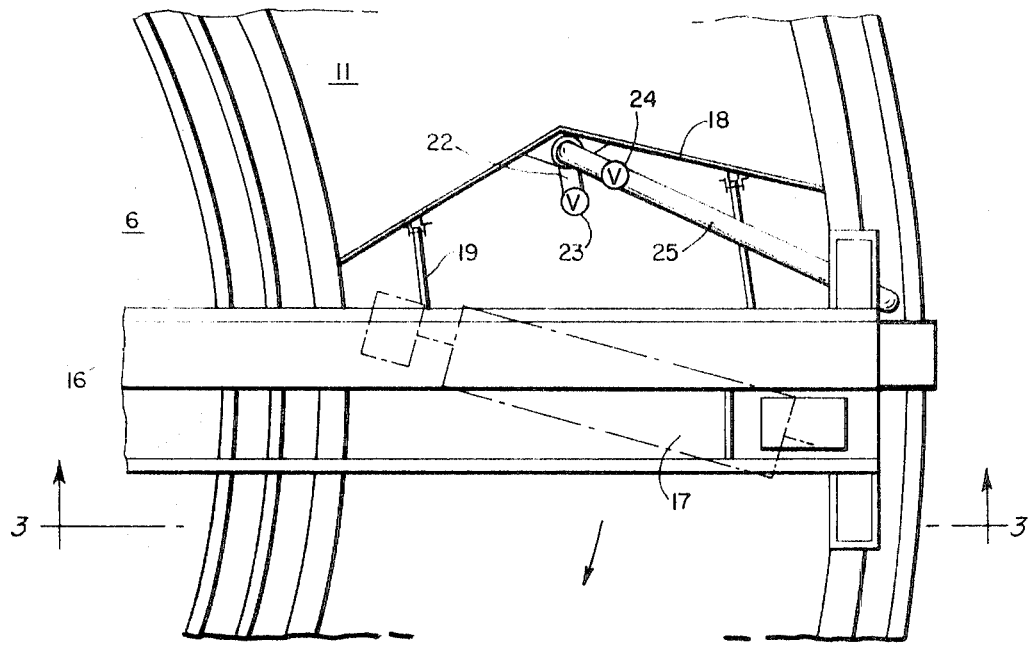
FIG. 2 is an enlarged plan view of a portion of FIG. 1.

The aerobic stabilization of the sludge in tank 11 is effected by simultaneously circulating and aerating this sludge. For accomplishing this purpose, and in accordance with FIGS 1 through 3, there is provided a surface aerator 17 mounted on a bridge 16. This aerator 17 is preferably of the type having a plurality of radially extending blades which rotate about a generally horizontal axis. This particular type of aerating device is quite suitable since it is not capable of being blocked by viscous and solid-mixed sludge material as would be the case, for example, with tubes, pipes and the like which extend below the surface of the liquid and through which the injected air is passed.

For effecting circulation of the sludge, there is provided a scrapper blade 18 connected to the bridge 16 for movement therewith by means of rod 19. This scraper blade preferably has a V-shaped profile for the purpose of collecting the sludge and urging the same towards the center of the V. The circulating means also includes a circulation pump 21 having an inlet end 20 located at the inside of the V of the scraper blade 18. With this arrangement, the pump inlet is located at the point of greatest concentration of the collected sludge. The pump then conveys the collected sludge accumulated by the scraper blades up the pipe 21 and outwardly through the sludge outlet opening 22 into the upper area of the tank, and preferably directly into the path of the gas being introduced into the liquid by means of the aeration rotor. After the sludge has been stabilized, the outlet opening 22 can be closed by means of a gate 23, after which the circulation pump 21 will transfer the stabilized sludge through the gate 24 to the outlet pipe 25 for removal from the tank 11.

This arrangement of the aeration rotor 17, as well as the bottom scraper blade 18 and the circulation pump 21 permits the separation of the aeration apparatus from the circulation apparatus, and also the separation of the aerating procedure from the circulating procedure. Consequently, it is no longer necessary to apply to the aeration means the same high level of energy which would be required if the aeration means were also used to effect the necessary circulation of the sludge. This greatly reduces the cost of manufacturing and operating the aeration rotor while concurrently satisfactorily treating the sludge to stabilize the same while avoiding fermentation of the sludge which would result if the aeration and/or the criculation were not adequate.

Sludge circulation is affected by the bottom scraper blade 18, in combination with the circulation pump 21. Both of thes elements serve to stir up the heavy sludge resting on the floor, and, in addition, convey this sludge up to the top areas of the tank. The sludge is thus effectively held in constant suspension and in this manner sufficiently aerated.

If the liquid in the stabilization tank is rather shallow, then adequate circulation of the sludge may be accomplished by replacing the bottom scraper blade 18 and/or the circulation pump 21 by a simple, downwardly inclined baffle plate, which plate would be arranged to lift the sludge to the appropriate point to be acted upon by the aeration rotor.

By arranging the scaper blade 18, the circulation pump 21 and the aeration rotor 17 on a common bridge 16, it is possible to operate the complete apparatus by a single driving means. Further, for maximum efficiency, the aeration rotor 17 should be placed forward of the circulation means, that is, forward in the direction of movement of the apparatus along the tank.

FIG. 4 illustrates a modification of the present invention wherein, in lieu of the aeration rotor 17, an air pipe 26 is connected directly above the scraper blade 18. Air from a suitable source such as a compressor 28 connected to the bridge is directed through a pipe 29 to the interior of the pipe 26 from which the air is dispersed through suitable air outlets 27. It is also possible to form the scraper blade 28 as an aerating device by making the blade hollow, adding suitable air outlets similar to air outlets 27, and delivering air through pipe 29 from the compressor 28 to the interior of the scraper blade 18. These latter arrangements are not as efficient as the arrangement shown in FIGS. 1 through 3. However for treatment plants wherein the quantity of sludge to be treated is relatively small, the simplified arrangements discussed above may be preferable.

Although the invention has been described in considerable detail with respect to a preferred embodiment thereof, it will be apparent that the invention is capable of numerous modifications and variations apparent to those skilled in the art without departing from the spirt and scope of the invention.

We claim:

1. A sewerage treatment apparatus comprising: a tank for aerobic stabilization of sewerage sludge, said tank defining a horizontally extending elongated path along which the liquid in the tank is continuously circulated, circulating means movable along said path for concurrently circulating the liquid in the tank into said continuous horizontal flow and for stirring up sludge from the bottom of the tank and moving the sludge to the vicinity of the surface of the liquid in the tank, said circulating means including a scraper blade movable along the bottom of the tank, and aerating means arranged to move along said elongated path with and just forward of the circulating means, said aerating means being located in the vicinity of the surface of the liquid in the tank, such that the aerating means continuously receive and aerates sludge stirred up by the circulating means; whereby as the circulating means and the aerating means move together along said elongated path, the sludge is circulated and stirred up primarily by the circulating means and the stirred up sludge is aerated primarily by the aerating means.

2. An apparatus according to claim 1 wherein the circulating means comprises a pump means for drawing sludge upwardly from the bottom of the tank.

3. An apparatus according to claim 1 wherein said circulating means further includes a pump having its inlet positioned to draw in sludge collected by said scraper blade.

4. An apparatus as claimed in claim 3 wherein said scraper blade is V-shaped, with the apex of the V pointing away from the direction of travel of the blade along the tank, and wherein said pump inlet is positioned at the said apex of the scraper blade on the side thereof facing the direction of travel of the blade along the tank.

5. An apparatus as claimed in claim 1 wherein the circulating means includes means for conveying stabilized sludge for removal from the tank.

6. An apparatus as claimed in claim 5 wherein said circulating means and said conveying means both include, as a part of each, a pump having an inlet in the vicinity of the bottom of the tank, the pump having a first outlet for delivering the sludge to the upper part of the tank to circulate the sludge and the pump having a second outlet outside of the tank for removing stabilized sludge from the tank.

7. An apparatus as claimed in claim 1 wherein said aeration means comprises a set of surface aerators mounted to rotate about a generally horizontal axis and located forward of said circulating means in the direction of movement of the circulating means along the tank.

8. An apparatus as claimed in claim 1 including a traveling bridge mounted above and movable along said tank, and wherein said aerating means and said circulating means are both connected to said bridge for movement therewith.

9. An apparatus as claimed in claim 8 wherein the aeration means comprises a set of blades rotatable about an axis, and wherein the axis of rotation of said blades is located forwardly of said circulating member in the direction of travel along the tank.

10. An apparatus as claimed in claim 9 wherein said sewage treatment apparatus also includes a circular secondary tank, and wherein the first said tank is annular and encircles said secondary tank, and wherein said bridge turns about the center of said secondary tank.

11. An apparatus as claimed in claim 1 wherein said sewage treatment apparatus includes a circular secondary tank, and wherein the first said tank is annular and surrounds said secondary tank.

12. An apparatus as claimed in claim 11 including an annular aeration tank surrounding the first said tank.

13. An apparatus as claimed in claim 11 including a traveling bridge mounted to turn about the center of the secondary tank and extending over the first said tank, and wherein both said circulating means and said aeration means are operatively connected to the bridge for movement therewith.

14. An apparatus according to claim 1, wherein said aeration means is operable to supply air independently of movement of said circulating means, and said circulating means is operable to circulate the liquid in the tank independently of the supplying of air by the aerating means.

15. A sewage treatment apparatus comprising, in combination, a tank for aerobic stabilization of sewerage sludge, said tank being in the shape of an endless closed path, a circulating means for stirring up the sludge in the tank said circulating means comprising a circular member located at the bottom of the tank and movable along said path of the tank, an aerating means for aerating the sludge in the tank, said aerating means being positioned to aerate stirred up sludge just forward of the circulating means in the direction of travel of the circulating means along said path, whereby the said stirring of the sewerage sludge in the tank is performed primarily by the circulating means and the aeration of the sludge is performed primarily by the aeration means, said circulating means further including a pump having its inlet positioned to draw in sludge collected by said scraper blade, and wherein said scraper blade is V-shaped, with the apex of the V pointing away from the direction of the travel of the blade along the tank, and wherein said pump inlet is positioned at said apex of the scraper blade on the side thereof facing the direction of travel of the blade along the tank.

16. A method for aerobic stabilization of sludge comprising the steps of: locating the sludge containing liquid in a tank defining a horizontally extending elongated path; and with a circulating device which includes a scraping member located at the bottom of the tank, continuously, circulating the liquid in the tank to cause the liquid to flow continuously and generally horizontally along said elongated path and also stirring up the sludge at the bottom of the tank to lift such sludge through a substantial distance above the bottom of the tank, and aerating the lifted sludge at said substantial distance above the bottom of the tank with an aerating device which moves along the elongated path with and just forward of the circulating means, the circulating and lifting being accomplished primarily by the circulating means and the aerating being accomplished primarily by the aerating means.

References Cited

UNITED STATES PATENTS

| | | | |
|---|---|---|---|
| 2,568,452 | 9/1951 | Kelly et al. | 210—221X |
| 2,901,114 | 8/1959 | Smith et al. | 210—15X |
| 3,295,682 | 1/1967 | Schramm | 210—195 |
| 3,330,413 | 7/1967 | Danjes | 210—197X |
| 3,435,954 | 1/1969 | Ohl et al. | 210—256X |
| 3,448,861 | 6/1969 | Berk | 210—256X |
| 2,477,459 | 7/1949 | Kelly | 210—528X |
| 2,649,412 | 8/1953 | Kivari et al. | 210—530X |
| 3,495,712 | 2/1970 | Schreiber | 210—256X |

FOREIGN PATENTS

| | | | |
|---|---|---|---|
| 196,810 | 8/1957 | Austria | 210—530 |

MICHAEL ROGERS, Primary Examiner

U.S. Cl. X.R.

210—151, 197, 219, 220, 256, 528